United States Patent [19]

Schneider et al.

[11] Patent Number: 5,083,415
[45] Date of Patent: Jan. 28, 1992

[54] METHOD FOR SEALING TENNIS BALL CONTAINER AND CONTAINER SO SEALED

[76] Inventors: Hubert A. Schneider, 9605 N. Linde Ct., Mequon, Wis. 53092; Richard L. Habeck, 5760 Racine Ave., New Berlin, Wis. 53148; Robert Seiy, 7070 W. Southridge Dr. - #70, Greenfield, Wis. 53220; Howard N. Myers, 6243 N. Berkeley Blvd., Milwaukee, Wis. 53217

[21] Appl. No.: 605,231

[22] Filed: Oct. 29, 1990

[51] Int. Cl.$^5$ .............................. B65B 31/04
[52] U.S. Cl. ........................ 53/432; 53/403; 53/468; 53/471; 156/147
[58] Field of Search ............... 53/79, 403, 404, 410, 53/415, 416, 420, 432, 467, 471, 478, 468; 156/147

[56] References Cited

U.S. PATENT DOCUMENTS

| | | | |
|---|---|---|---|
| 1,207,814 | 12/1916 | Stockton | 53/432 X |
| 3,367,808 | 2/1968 | Edwards | 53/478 X |
| 3,974,622 | 8/1976 | Stubblefield, Jr. | 53/403 |
| 4,031,688 | 6/1977 | Wasserman | 53/403 |
| 4,073,120 | 2/1978 | Berggren | 53/403 X |
| 4,262,472 | 4/1981 | Soeda et al. | 53/403 |
| 4,439,976 | 4/1984 | Yuji et al. | 53/403 |
| 4,524,563 | 6/1985 | Sassi | 53/469 |
| 4,909,022 | 3/1990 | Kubis et al. | 53/DIG. 2 |
| 4,920,726 | 5/1990 | Yamada et al. | 53/79 |

Primary Examiner—John Sipos
Attorney, Agent, or Firm—Fuller, Ryan & Hohenfeldt

[57] ABSTRACT

A method of making a sealed tennis ball container, and the container so sealed. The container is first inserted into a cylindrical canister, resting the shoulder of the container on the upper rim of the canister. After tennis balls are placed into the container, a disk having heat sealable polymer membrane material is placed on the container shoulder. An induction heat/sonic transducer head is clamped to the container shoulder under pressure, pressing the seal against the container shoulder. The sonic transducer is then energized to molecularly bond the disk to the container shoulder, to thereby seal the container from the passage of air, with the tennis balls inside. A heated probe is then melted through the wall of the container to thereby make an opening in the wall. A gas is injected into the container through the probe while still inserted in the container, to a level of pressure substantially above the final desired pressure. The probe is then withdrawn, thus permitting some of the pressure to escape through the opening, leaving the actual level of pressure at about the final desired pressure. The opening is then heat sealed or melt sealed.

5 Claims, 1 Drawing Sheet

METHOD FOR SEALING TENNIS BALL CONTAINER AND CONTAINER SO SEALED

BACKGROUND OF THE INVENTION

The invention relates to pressurized containers, and in particular to methods for sealing tennis ball containers after loading and the containers arrived at by these methods.

Tennis balls, racquetballs and other pressurized balls are typically sold in a pressurized can or other container which is intended to maintain the pressure in the interior of the ball at a level somewhat above atmospheric. In the past these balls have been sealed in either metal or plastic containers using a relatively rigid metal disk seal. This has been hazardous in that there is a likelihood that the sharp edges of the metal disk seal could result in injury to the user.

This invention relates to improvements to the devices and methods described above and to solutions to the problems raised or not solved thereby.

SUMMARY OF THE INVENTION

The present invention provides a seal made from a micro-thin polymer membrane-like seal member which includes heat sealable adhesives. This seal member is applied to the upper rim of a plastic container for balls or similar articles. In the process the seal member is molecularly bonded to the rim and is capable of holding the working pressure in the ball container until the container is ready is to be opened for use of the balls. The plastic container is placed in a suitable canister-type fixture and a disk of the polymer membrane material is clamped over the rim of the plastic container and on the fixture. A sonic/induction welding module molecularly bonds the disk to the plastic rim. The bonding is adequate to withstand the relatively low pressure introduced in the container.

The plastic container is also suitable for piercing by a heated needle or probe air injection system. The probe is moved through an aperture in the fixture canister and melts its way into the plastic container, creating an opening in the container. Air is then injected to a level above the final desired pressure, and the probe is withdrawn. The opening left by the probe is then melt-sealed to retain the pressure, before all the pressure can escape.

A container constructed according to the invention thus has the advantage of maintaining the pressure on the balls contained therein without the necessity of the sharp-edged hard metal disk cover.

Other objects and advantages of the invention will become apparent hereinafter.

DESCRIPTION OF THE PREFERRED EMBODIMENT

Figure 1:
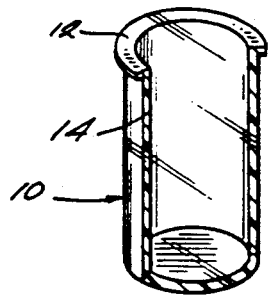
FIG. 1 is a side elevational view, partially in section, of a container constructed according to a preferred embodiment of the invention.

Referring now to FIG. 1, there is shown a container 10 constructed according to a preferred embodiment of the invention for the purpose of containing pressurized balls, such as tennis balls, racquetballs and so on, and maintaining pressure therein. The container is constructed of a suitable material such as that manufactured by Eastman and marketed under the designation PETG polyester 6763. This material is suitable because it is meltable at relatively low temperatures and quickly sets when the heat source is removed. It also has the advantage that it is clear so that the balls or other articles to be stored therein are easily visible.

The container 10 is preferably injection molded in a suitable form, depending upon the size and number of the balls or other articles to be stored therein. For instance the technique employed herein, and described below, can be used equally well on regular containers holding three or so tennis balls, and on jumbo containers which can hold up to 50 or more tennis balls. The container 10 may be generally cylindrical, the only specific requirement being that there be a well-defined shoulder 12 entirely about the top perimeter thereof. The shoulder 12 projects outward a suitably short distance beyond the sidewall 14 of the container, about 0.250 inches, substantially normal to the sidewall.

Figure 2:
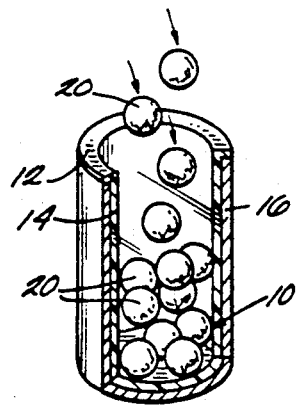
FIG. 2 is a view, partially in section, of a canister-type fixture according to the invention, having a container and balls therein.

Referring now to FIG. 2, once formed, the container 10 is placed in a canister-type fixture 16, which conforms substantially to the size and shape of the outside of the container. Once in the fixture 16, the shoulder 12 of the container 10 rests evenly on the upper lip 18 of the canister. Then the container 10 is filled with balls 20 or other articles to be stored.

Figure 3:
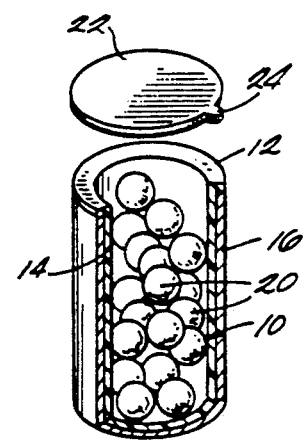
FIG. 3 is a perspective view of the container and fixture shown in FIG. 2, and the seal member to be affixed thereon.

As shown in FIG. 3, a sealing disk 22 is then placed upon the throat of the container 10. In the embodiment shown there, the sealing disk 22 includes a tab 24 to facilitate removal of the disk when the user wishes to use the balls in the container. The sealing disk 22 is preferably formed of a laminated membrane material including a non-permeable polymer membrane and a permanently bonded pulpboard backing applied to one surface thereof. One material that is suitable for use as the non-permeable polymer membrane is manufactured by 3M and marketed under the trademark Safe-Gard 102.

Figure 4:
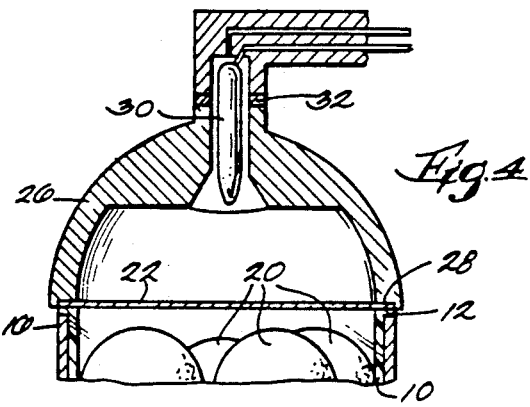
FIG. 4 is a side view, partially in section, of a fixture, container and sealing horn according to the invention.

After the sealing disk 22 is placed on the throat of the container 10, referring now to FIG. 4, a dome-type horn mechanism 26 is placed over the disk. This placement of the horn 26 can be done by any suitable means, such as a hydraulic or preferably a pneumatic cylinder. The horn 26 includes an annular contact surface 28 which conforms to the size and shape of the shoulder 12 of the container 10. To attach the sealing disk 22 to the container 10, the mechanism 26 compresses the disk onto the shoulder 12 of the container, preferably to a pressure of about 40 p.s.i. As described above, the shoulder 12 is backed by the upper lip 18 of the fixture canister 16. The mechanism 26 combines sonic welding and induction welding to adhere the sealing disk 22 firmly to the shoulder 12. In particular, the mechanism 26 includes a high-intensity sonic module 30 with an induction welding element 32. Thus, with the horn 26 in place as shown in FIG. 4, and the pressure applied as described above, the sonic module 30 and the induction welding element 32 are energized substantially simultaneously, molecularly bonding the sealing disk 22 to the shoulder 12.

Figure 5:
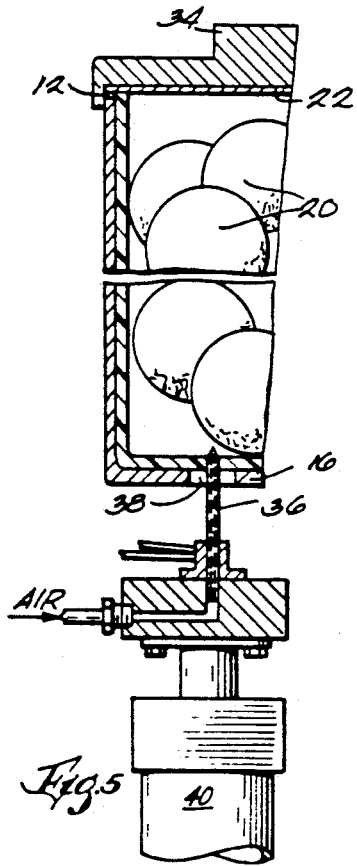
FIG. 5 is a side view, partially in section, of a fixture, container and air injection apparatus according to the invention.

Once the sealing disk 22 is securely bonded as indicated, the container must be pressurized so as to ensure that the balls 20 retain their pressure during shipping and storage. The horn 26 is therefore retracted and, as shown in FIG. 5, a retainer plate 34 is positioned over the container 10, and thus over the lip 18 of the canister 16. This placement can be done by any suitable means, such as a hydraulic or preferably a pneumatic cylinder. Then a non-toxic, inexpensive and readily available gas, such as air, is injected into the container 10. This injection is accomplished by inserting a heated pressurizing probe 36 into an opening 38 in the canister 16 provided for that purpose. The motion of the probe 36 is provided by any suitable means, such as a hydraulic cylinder, or preferably a pneumatic cylinder 40. The insertion is continued to the point where the probe 36 contacts some portion of the wall 14 of the container 10, whether on the side or preferably on the bottom.

Because the probe 36 is heated and quite finely pointed, the wall 14 of the container 10 melts away sufficiently to permit entry of the tip of the probe into the container. Thus is formed a very small opening, on the order of about 1/32 of an inch, in the container 10. At this point the gas is introduced into the container 10 through the probe 36, and the container is thus pressurized. The container 10 is pressurized substantially above the final desired level of pressure in the container. In the most preferred embodiment the pressure inside the container 10 is brought up to about 28 p.s.i.

Figure 6:
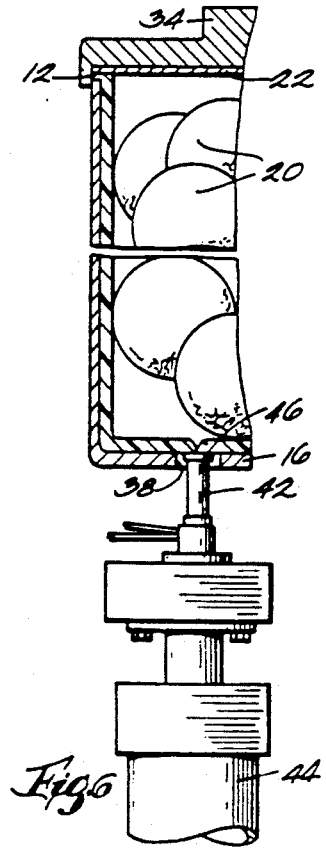
FIG. 6 is a side view, partially in section, of a fixture, container and container re-sealing apparatus according to the invention.

Then the probe 36 is retracted from the opening created in the container 10 and from the opening 38 in the canister 16. The canister 16 then is moved to the next station, and a sealing probe 42 is advanced, again preferably by a pneumatic cylinder 44, into the opening 38 in the canister 16 and into contact with the container wall 14, at the same point contacted by pressurizing probe 36, as shown in FIG. 6. The sealing probe 42 has as its foremost surface a flat face 46. When this heated flat face 46 contacts the container wall 14, the small opening made therein by the pressurizing probe 36 is melted closed. Thus the container 10 is sealed with the pressure retained inside with the balls 20.

Figure 7:
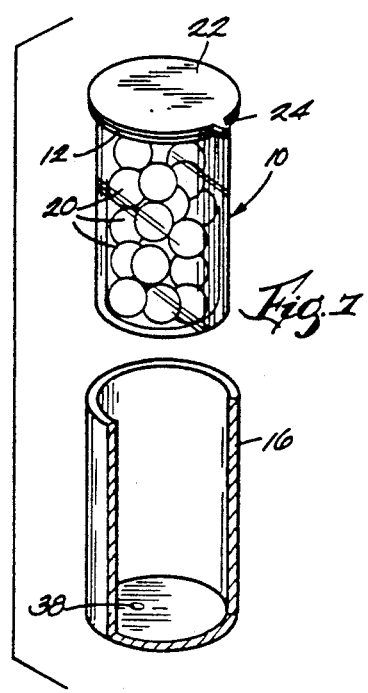
FIG. 7 is a perspective view, partially in section, of a container being withdrawn from a fixture according to the invention.

It is contemplated that by the time the sealing probe 42 has sealed the small opening in the container wall, some of the pressurized gas will have leaked out the opening. This is part of the reason the pressure inside the container 10 is brought up to about 28 p.s.i. The desired final pressure in the container 10 is about 21 to 22 p.s.i., and this is about the level which is reached by the time the container is sealed by the sealing probe 42. At this latter pressure the sealing disk 22, properly attached to the container shoulder 12, will sufficiently retain the pressure in the container. As shown in FIG. 7, the container 10 may then be removed from the fixture 16, the latter then being ready to repeat the process. Hence the invention provides a container for containing tennis balls or other pressurized balls, and for retaining the pressure in those balls. This aim is accomplished without the use of any hard metal disk which could have a sharp edge and cause injuries.

While the method and apparatus hereinbefore described are effectively adapted to fulfill the aforesaid objects, it is to be understood that the invention is not intended to be limited to the specific preferred embodiment of method for sealing tennis ball container and container so sealed set forth above. Rather, it is to be taken as including all reasonable equivalents within the scope of the following claims.

We claim:

1. A method of sealing and pressurizing a container containing selected articles, said method comprising:
   providing a plastic container having an upper container rim,
   inserting said container into a fixture, said fixture having an upper rim, and resting said container rim on said fixture upper rim,
   filling said container with the selected articles,
   placing a disk, having heat sealable polymer membrane material permanently bonded to a paperboard backing, on said container rim,
   clamping an induction heat/sonic transducer head to said container rim under pressure, said head having a head rim which engages said disk and presses said disk against said container rim,
   energizing said sonic transducer to molecularly bond said disk to said container rim,
   meltingly piercing said container by use of a heated, hollow probe,
   injecting pressure through said probe while inserted in said container,
   withdrawing the hollow probe from said container, and
   sealing said container by contacting said container where pierced with a heated flat sealing tool so as to melt the container material to close the opening made by said probe, to thereby maintain pressure in said container.

2. A method of making sealed tennis ball containers comprising:
   providing a plastic ball container having a wall and an upper rim, a disk bondable to said upper rim, and a heated probe air injector means;
   inserting tennis balls into the container;
   bonding the disk to the upper rim of the container to thereby seal the container from the passage of air;
   melting the probe through the wall of said container to thereby make an opening in the wall;
   injecting air pressure in said container through said probe while still inserted in said container;
   withdrawing the probe; and
   heat-sealing the opening.

3. A method of making sealed tennis ball containers containing a predetermined level of pressure above atmospheric, said method comprising:
   providing a plastic ball container having a wall and an upper rim, a disk bondable to said upper rim, and a heated hollow probe air injector means;
   loading tennis balls into the container;
   bonding the disk to the upper rim of the container to thereby seal the container from the passage of air, with the tennis balls inside;
   melting the probe through the wall of said container to thereby make an opening in the wall;
   injecting air pressure in said container through said probe while still inserted in said container, to a level of pressure substantially above said predetermined level of pressure;

withdrawing the probe and permitting some of the pressure to escape through the opening, leaving the actual level of pressure at about the predetermined level of pressure; and heat-sealing the opening by contacting said container in the area of the opening with a heated blunt sealing tool so as to melt the container material to close the opening.

4. A method as recited in claim 3 wherein air pressure is injected into the container to the extent of about 28 pounds per square inch.

5. A method as recited in claim 4 wherein the pressure is permitted to escape so that about 21 to 22 pounds per square inch remains.

* * * * *